US010462256B2

(12) United States Patent
Ross

(10) Patent No.: US 10,462,256 B2
(45) Date of Patent: Oct. 29, 2019

(54) COMPARISON OF BEHAVIORAL POPULATIONS FOR SECURITY AND COMPLIANCE MONITORING

(71) Applicant: Curtail, Inc., Anaheim, CA (US)

(72) Inventor: Robert F. Ross, Santa Ana, CA (US)

(73) Assignee: Curtail, Inc., Anaheim, CA (US)

( * ) Notice: Subject to any disclaimer, the term of this patent is extended or adjusted under 35 U.S.C. 154(b) by 289 days.

(21) Appl. No.: 15/429,050

(22) Filed: Feb. 9, 2017

(65) Prior Publication Data

US 2017/0230477 A1 Aug. 10, 2017

Related U.S. Application Data

(60) Provisional application No. 62/293,438, filed on Feb. 10, 2016.

(51) Int. Cl.
*H04L 29/08* (2006.01)
*H04L 29/06* (2006.01)
*H04L 12/24* (2006.01)

(52) U.S. Cl.
CPC ........ *H04L 67/306* (2013.01); *H04L 41/0886* (2013.01); *H04L 41/142* (2013.01);
(Continued)

(58) Field of Classification Search
CPC ............... H04L 41/0886; H04L 41/142; H04L 63/0227; H04L 63/1425; H04L 67/22;
(Continued)

(56) References Cited

U.S. PATENT DOCUMENTS 6,308,217 B1 10/2001 Sasagawa
6,889,218 B1 * 5/2005 Nassehi .................. G06F 21/55
706/45

(Continued)

FOREIGN PATENT DOCUMENTS

EP 1059578 A2 12/2000
WO WO-2011139176 11/2011
(Continued)

OTHER PUBLICATIONS

Nagy et al. Fit Computer Science Technical Report: CS-2006-04. "N-Version Programming for the Detection of Zero-day Exploits". Invited paper, presented at: The IEEE Topical Conference on Cybersecurity, Daytona Beach, FL, Apr. 2006.
(Continued)

*Primary Examiner* — Alina A Boutah
(74) *Attorney, Agent, or Firm* — Van Pelt, Yi & James LLP

(57) ABSTRACT

Techniques to compare behavioral populations for security and compliance monitoring are disclosed. In various embodiments, for each of a plurality of implementations of a computing resource a corresponding behavioral profile data is store, which includes for each of a plurality of observed behavioral patterns observed to have been exhibited by the implementation a corresponding summary representation of one or more characteristic traits of the behavioral pattern. At least portions of said behavioral profile data associated with one or more implementations included in a cohort comprising a sub-population of said plurality of implementations identified by configuration data as being associated with said cohort is used to determine that an observed behavior of a member implementation of the cohort deviates from an expected behavior of members of the cohort.

23 Claims, 7 Drawing Sheets

(52) U.S. Cl.
CPC .......... *H04L 63/1425* (2013.01); *H04L 67/22* (2013.01); *H04L 63/0227* (2013.01)

(58) Field of Classification Search
CPC .............. H04L 67/306; H04L 63/1441; G06Q 20/4016; G06Q 50/01; H04W 12/12; G06F 16/337; G06F 21/552; G06F 21/554; G06F 21/577
See application file for complete search history.

(56) References Cited

U.S. PATENT DOCUMENTS

| | | | |
|---|---|---|---|
| 6,996,817 B2 | 2/2006 | Birum | |
| 7,523,494 B2 | 4/2009 | Himberger | |
| 8,352,870 B2 | 1/2013 | Bailor | |
| 8,407,670 B2 | 3/2013 | Hegde | |
| 8,505,027 B2 | 8/2013 | Warner | |
| 8,528,077 B1 | 9/2013 | Tidwell | |
| 8,560,344 B2 | 10/2013 | Earles | |
| 8,726,387 B2 | 5/2014 | Stahlberg | |
| 9,124,640 B2 | 9/2015 | Sweet et al. | |
| 9,407,652 B1* | 8/2016 | Kesin | G06N 7/005 |
| 9,454,726 B1* | 9/2016 | Yao | G06N 5/022 |
| 9,590,854 B1 | 3/2017 | Shekhar | |
| 2002/0057687 A1 | 5/2002 | Birkenmaier | |
| 2006/0271885 A1 | 11/2006 | Pittendrigh | |
| 2008/0126277 A1* | 5/2008 | Williams | G06F 19/3481 706/14 |
| 2010/0057510 A1 | 3/2010 | Stevens | |
| 2010/0325685 A1 | 12/2010 | Sanbower | |
| 2011/0096999 A1 | 4/2011 | Willis | |
| 2012/0188087 A1* | 7/2012 | Wang | H04L 67/303 340/657 |
| 2012/0215491 A1 | 8/2012 | Theriot | |
| 2014/0122325 A1* | 5/2014 | Zoldi | G06Q 20/4016 705/39 |
| 2014/0143873 A1* | 5/2014 | Stirtzinger | H04L 63/1408 726/23 |
| 2014/0164416 A1* | 6/2014 | Hosseini | G06Q 50/2053 707/758 |
| 2014/0279736 A1* | 9/2014 | Glass | G06Q 30/0282 706/12 |
| 2014/0280550 A1* | 9/2014 | Glass | H04L 67/22 709/204 |
| 2014/0280890 A1* | 9/2014 | Yi | H04L 67/22 709/224 |
| 2014/0282964 A1 | 9/2014 | Stubblefield | |
| 2015/0039749 A1 | 2/2015 | Kwan | |
| 2015/0046405 A1 | 2/2015 | Brueckner | |
| 2015/0101053 A1* | 4/2015 | Sipple | H04L 63/1425 726/24 |
| 2015/0121518 A1* | 4/2015 | Shmueli | H04L 63/1425 726/22 |
| 2015/0180893 A1* | 6/2015 | Im | H04L 63/1416 726/23 |
| 2015/0324563 A1* | 11/2015 | Deutschmann | H04L 67/22 726/7 |
| 2015/0363791 A1 | 12/2015 | Raz et al. | |
| 2016/0253688 A1* | 9/2016 | Nielsen | G06Q 30/0202 705/7.31 |
| 2016/0373477 A1* | 12/2016 | Moyle | G06F 21/552 |
| 2017/0013110 A1 | 1/2017 | Sato | |
| 2017/0228657 A1* | 8/2017 | Kinnier | G06N 7/005 |

FOREIGN PATENT DOCUMENTS

| | | |
|---|---|---|
| WO | 2015004543 A1 | 1/2015 |
| WO | 2017062972 A1 | 4/2017 |

OTHER PUBLICATIONS

@pzdk. Diffy: Testing Services Without Writing Tests. Sep. 3, 2015: https://blog.twitter.com/engineering/en_us/a/2015/diffy-testing-services-without-writing-tests.html.

Vishwanathan et al. Graph Kernels. Journal of Machine Learning Research 11 (20210) 1201-1242. Submitted May 2008; Revised Apr. 2009; Published Apr. 2010.

* cited by examiner

COMPARISON OF BEHAVIORAL POPULATIONS FOR SECURITY AND COMPLIANCE MONITORING

CROSS REFERENCE TO OTHER APPLICATIONS

This application claims priority to U.S. Provisional Patent Application No. 62/293,438 entitled COMPARISON OF BEHAVIORAL POPULATIONS FOR SECURITY AND COMPLIANCE MONITORING filed Feb. 10, 2016 which is incorporated herein by reference for all purposes.

BACKGROUND OF THE INVENTION

Behavioral anomaly detection systems are known, but typically such systems must be provided an opportunity to observe a system's behavior during a training period, in which the system is assumed to be secure. Later, in a detection period, behavior that deviates from the learned and assumed normal behavior may be flagged as anomalous and subjected to further examination. Such systems may flag as anomalous behavior that may not present any security concern, such as authorized changes in software (e.g., updates and upgrades), changes in user behavior that are authorized and/or expected, e.g., due to a change in role, etc. Any deviation from the "normal" behavior learned based on the training data may be flagged.

Techniques have been disclosed to compare, e.g., simultaneously and in real time, two or more implementations of a same system or component. For example, two servers that should operate in the same way may be sent a same request. If the responses, do not match, responsive action may be taken.

It would be useful to be able to detect anomalous behavior without requiring redundant processing of the same request by multiple implementations and without necessarily flagging as anomalous all departures from behavior a particular system was observed to exhibit during a prior learning period.

BRIEF DESCRIPTION OF THE DRAWINGS

Various embodiments of the invention are disclosed in the following detailed description and the accompanying drawings.

DETAILED DESCRIPTION

Figure 1:
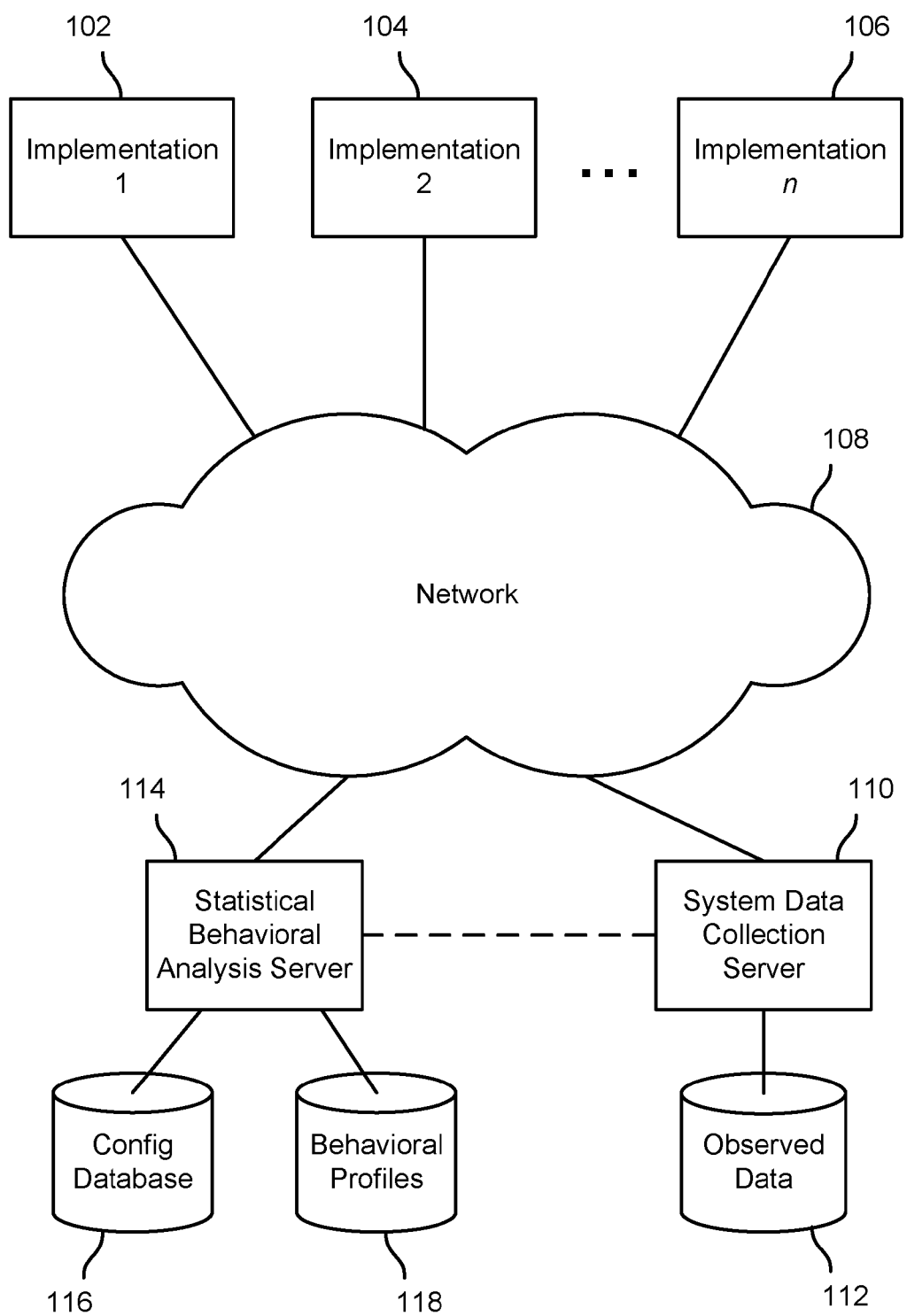
FIG. 1 is a diagram illustrating an embodiment of a system to perform behavioral analysis based on observed behavior of a cohort.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to detect potential security concerns by comparing the observed behavior of an implementation of a computing resource to the behavior of other implementations included in a cohort of which the implementation is a member are disclosed.

In various embodiments, the behavior of a population of implementations may be determined and represented by profiling the network traffic passively to identify common patterns and behaviors. Commonly associated or correlated patterns of network traffic may be identified from the network traffic. The comparison of implementation behavior may include looking for behaviors that are not associated with previous known patterns and/or behaviors that are unusual in the population as a whole.

In some embodiments, the behavior of a population is compared by performing statistical comparison of the traffic profiles. Observations of network traffic consist of a series of events (represented by network packets) over time. Each of these events can be interpreted as a point in a multidimensional space. The various parameters of the network traffic may be represented as components of a vector that represents a single observation. Components of such a vector include the relevant details which can be used to summarize patterns and correlate individual events into higher level aggregations. Several events corresponding to the same network session, for example, may be associated due to their proximity in the feature space or because there is a strong correlation in the timing of a collection of events.

Summaries of the statistical profile of individual implementations may be compared for similarity. Long term averages such as the frequency of particular protocols and ports of traffic, correlation between frequency of different network events, standard deviation of the average behavior, and other statistical measures may be used for comparison between implementations. Determining the probability that fair sampling from the other distribution would generate one distribution can then allow comparison of these probability distribution summaries. The exact probability threshold can be configured by a user to allow fine tuning of the balance of false positive and false negative reports.

Interpretation of statistical profiles and searching for correlation and temporal patterns in a series of network traffic events is implemented in some embodiments via machine learning methods. Using a recurrent neural network structure as a means of interpreting the network traffic can identify temporal patterns based on work shifts, corporate policies, scheduled activities, and other sources of regularity in the timing of network traffic. By means of a non-linear sparse classifier the higher level patterns of this behavior can be distilled into variables meaningful in the software security environment, such as identifying which software packages are installed on a particular implementation or the organizational roles of the users of an implementation. Using generative models such as Boltzmann machines to classify high level features of network traffic allows comparing observed patterns to the expected probability distribution generated by the Boltzmann machine. In the case where the hidden units of the generative model represent a sparse encoding of beliefs regarding roles, software packages, and other relevant descriptors of causes of network traffic patterns, it is possible to compare the observed network traffic and report high level concepts associated with the most likely cause of the change in network traffic. Examples of such high level concepts for explaining a new cause could include installation of new software, changes in user habits and behavior, reassignment of resources within an organization, an attempted attack of network attached resources, or any other cause which might be identified by identifying temporal and spatial patterns in network traffic. Simpler comparison methods can also be performed, such as using an auto-encoder instead of a Boltzmann machine and directly comparing the hidden layer state for equality. Composition of several layers of processing of network traffic can provide improved accuracy over a simple single layer implementation.

Any of the comparison methods described above may be applied, in various embodiments, to generate a description of the causes of the network traffic patterns on a particular implementation. While this information could be used to provide higher quality interpretation and comparison of network traffic as a method of reducing false positives, it can also be used to present an inventory to administrators that can inform the management of network resources. Use cases can include license enforcement and corporate policy enforcement regarding the quantity or identity of particular software packages deployed in the network.

FIG. 1 is a diagram illustrating an embodiment of a system to perform behavioral analysis based on observed behavior of a cohort. In the example shown, a plurality of implementations 1 through n, represented in FIG. 1 by implementations 702, 704, and 706, comprise a population of computer resources, such as servers, databases, protocols, stacks, services, standards-based resources, etc., expected to have a same behavior profile. For example, implementations 702, 704, and 706 may be instances of a same physical and/or logical server, application, service, protocol stack, etc. comprising same or interchangeable hardware and/or software configured in a same way. As used herein, the term "implementation" may refer to an instance of any computer resource as implemented.

In the example shown, implementations 702, 704, and 706 are connected via network 108, e.g., the Internet and/or one or more private networks, to a system data collection server 110. Data collection server 110 gathers observation data from implementations 702, 704, and 706, e.g., connections made, ports used, services accessed, session duration, etc., and stores raw observation data in a database 112.

A statistical behavioral analysis server 114 uses a configuration database 116 to track which implementations are peers of (i.e., included in a same behavioral cohort as) which others. The associations may be explicit, or implied by shared configuration or other data store in a configuration database 116. In some embodiments, configuration database 116 may be populated by an administrative user. For example, the administrative user might identify via configuration data stored in database 116 which members of the population of implementations 1 through n are included in a given behavioral cohort together, and/or the administrative user may store sets of configuration attributes that imply and/or may be used to derive or determine the members of a same behavioral cohort.

A behavioral cohort, as used herein, comprises a set of implementations expected, based on a shared configuration and/or other attributes, to exhibit a same behavioral profile. A behavioral profile as used herein comprises data that summarizes one or more behavioral patterns exhibited by an implementation over time, such as which systems the implementation established connections with, which ports, protocols, services, etc. were used, how long the session lasted, how frequently a given system was connected to, etc. A behavioral profile may comprise a vector that represents a behavior and/or behavioral pattern (e.g., a set of related behaviors over time) in multi-dimensional space. Vector mathematics may be used in some embodiments to determine a degree of similarity or difference between observed behaviors.

In the example shown in FIG. 1, behavioral profiles are stored in a database 118. Behavioral profiles may be updated based on subsequent observations, e.g., based on raw observation data gathered by system data collection server 110.

Figure 2:
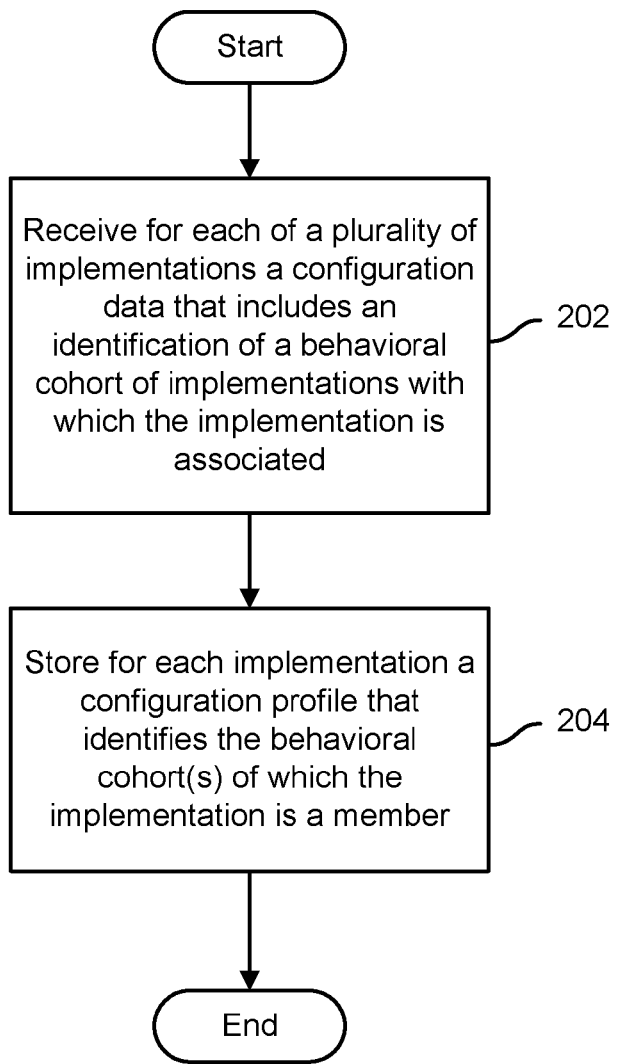
FIG. 2 is a flow chart illustrating an embodiment of a process to receive and store configuration data.

FIG. 2 is a flow chart illustrating an embodiment of a process to receive and store configuration data. In various embodiments, the process of FIG. 2 may be performed by a computer, such as statistical behavioral analysis server 114 of FIG. 1. In the example shown, configuration data is received for each of a plurality of implementations (202). For each implementation, the configuration data includes an identification of a behavioral cohort of implementations with the implementation is associated. The configuration data for each implementation is stored in a profile that identifies the behavioral cohort(s) of which the implementation is a member (204).

In various embodiments, a cohort may be identified explicitly. For example, an implementation may be identified as being associated with a group that comprises a behavioral cohort. In some embodiments, a behavioral cohort may be determined based on data stored explicitly in a configuration profile for an implementation. For example, a human or other user may be identified as being associated with an implementation (e.g., a desktop or laptop computer, virtual desktop, etc.). External data, such as an enterprise directory, may be accessed to determine a role, privilege, etc. associated with the user, and cohort membership may be determined at least in part based on the determined role, etc. For example, management level employees may use a virtual desktop or other computer differently than non-management employees, engineering department members may use a resource differently than marketing or human relations department members, etc. Similar resources associated with a same type of user may be determined based on such role, etc. information to be members of a same behavioral cohort, while other types of users of the same resource may not be included in that cohort.

In various embodiments, configuration data that identifies a cohort, directly or indirectly and/or explicitly or implicitly, may be stored in a configuration database, such as database 116 of FIG. 1.

Figure 3:
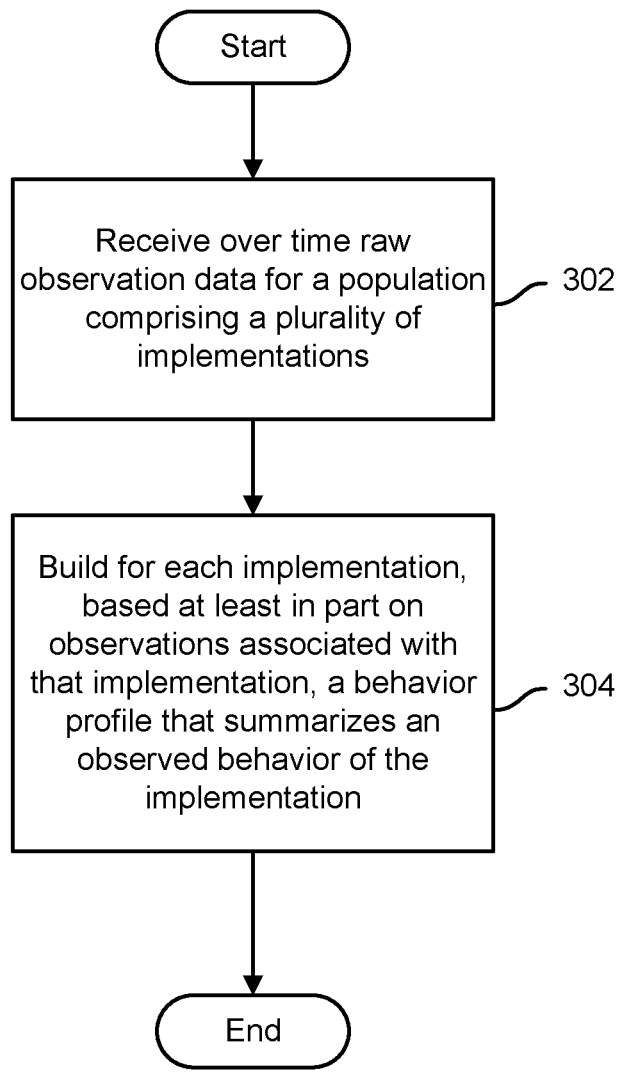
FIG. 3 is a flow chart illustrating an embodiment of a process to create and store behavioral profiles.

FIG. 3 is a flow chart illustrating an embodiment of a process to create and store behavioral profiles. In various embodiments, the process of FIG. 3 may be performed by a computer, such as statistical behavioral analysis server 114 of FIG. 1. In the example shown, raw observation data for a population of implementations is received over time (302). In various embodiments, observation data may be received as such data is generated and/or provided as output by such implementations, and/or may be gathered, e.g., at a server such as system data collection server 110 of FIG. 1, and may be provided from time to time in batches to a computer performing the process of FIG. 3. Examples of raw observation data include without limitation log data at any granularity, statistics, etc.

For each implementation, a behavioral profile is built based at least in part on observations associated with that implementation (304). In various embodiments, a behavioral profile of an implementation includes data that represents and summarizes an observed behavior of the implementation. For example, a behavioral profile may reflect that an implementation has been observed to connect to a backup server and perform a backup every night starting at midnight, and taking on average forty minutes to complete. Another example of an item or entry in a behavioral profile may indicate the implementation typically is active during a certain window corresponding to normal business hours and typically inactive at other times. In another example, a behavior may be expressed as a frequency (e.g., connects with a certain e-commerce cite on average twice a week) and/or in relative terms (e.g., starts email application within fifteen minutes of logging on), etc.

In various embodiments, behavioral profile data may be stored in a database, such as behavioral profile database 118 of FIG. 1.

Figure 4:
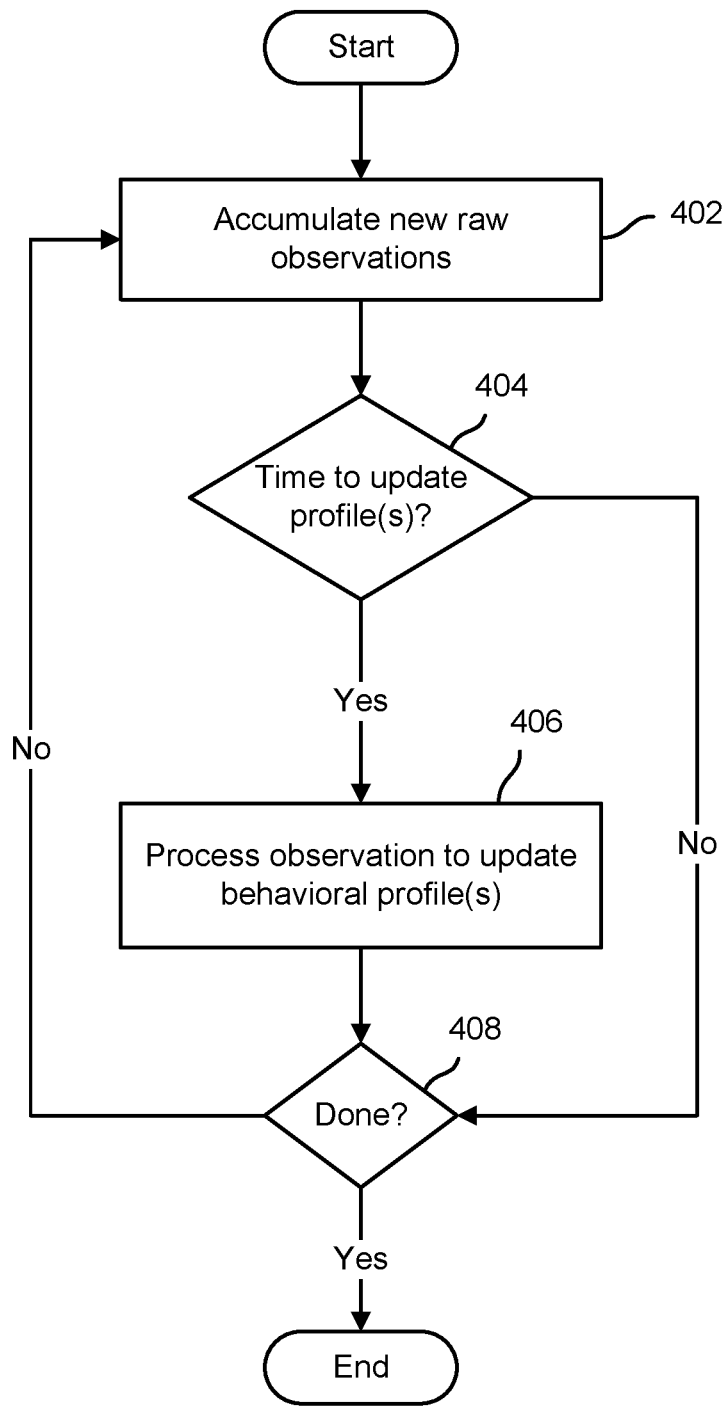
FIG. 4 is a flow chart illustrating an embodiment of a process to update a behavioral profile.

FIG. 4 is a flow chart illustrating an embodiment of a process to update a behavioral profile. In various embodiments, the process of FIG. 4 may be performed by a computer, such as statistical behavioral analysis server 114 of FIG. 1. In the example shown, new raw observations are accumulated for a time, e.g., across a plurality of implementations (402). If a time to update one or more profiles arrives (404), e.g., a prescribed period since a last update has expired, a prescribed threshold amount of new observation data has been accumulated, etc., then observation data is processed to update the behavioral profile(s) of implementations with which the observation data is associated (406). The process of periodic (or event-driven) update (402, 404, 406) repeats, as needed, until the process of FIG. 4 is done (408), e.g., the server performing the process of FIG. 4 is taken offline for maintenance.

Figure 5:
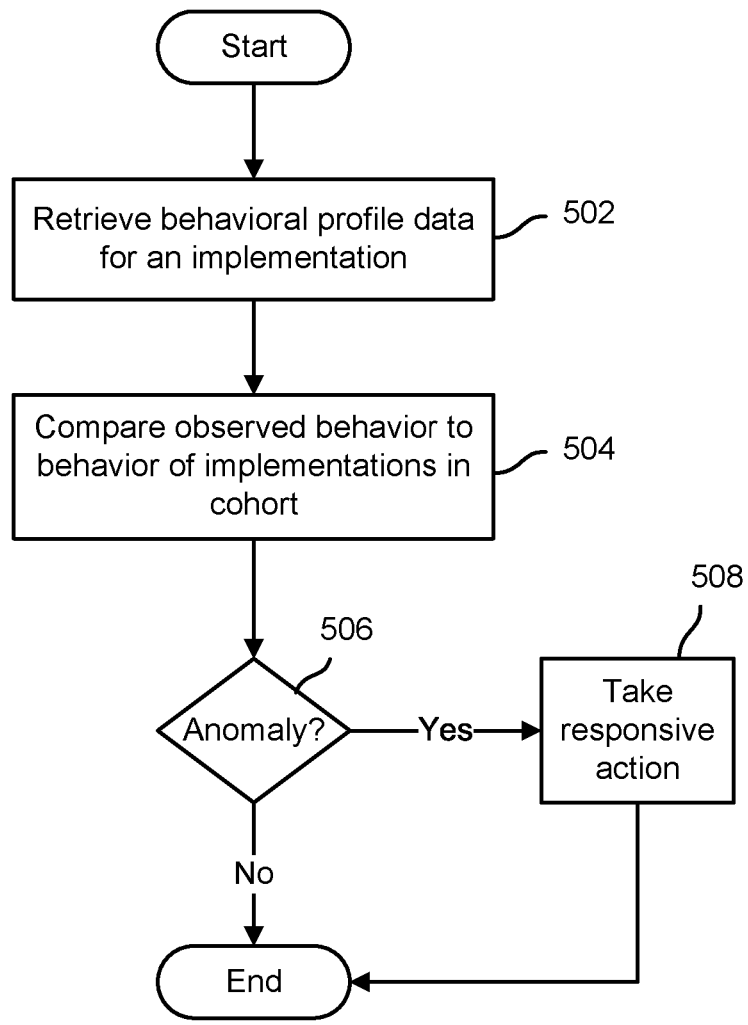
FIG. 5 is a flow chart illustrating an embodiment of a process to compare a behavioral profile of an implementation to corresponding profiles of one or more implementations in a cohort.

FIG. 5 is a flow chart illustrating an embodiment of a process to compare a behavioral profile of an implementation to corresponding profiles of one or more implementations in a cohort. In various embodiments, the process of FIG. 5 may be performed by a computer, such as statistical behavioral analysis server 114 of FIG. 1. In the example shown, behavioral profile data for an implementation is retrieved (502), e.g., from a database such as behavioral profile database 118 of FIG. 1. The observed behavior of the implementation, as represented by the behavioral profile, is compared to corresponding behavioral profile data of one or more other implementations that are members of a same cohort as the implementation (504). If a statistically significant departure from the behavior of other members of the cohort is detected (506), responsive action is taken (508).

Examples of responsive action include, without limitation, generating an alert, report, or other notification; quarantining or otherwise blocking access to the implementation; and performing further automated analysis to determine a cause that explains the departure from expected behavior and/or a proposed solution. For example, the anomalous behavior may indicate that a known vulnerability of the implementation has been exploited, and a remedial action (e.g., software patch, removal of malware, etc.) may be suggested to an administrator and/or taken automatically, depending on the configuration.

In various embodiments, in comparing the observed behavior of an implementation with the behavioral profile of members of its cohort, differences in timing and cohort-changing events may be taken into account. For example, the behavior of an implementation that installed a certain software upgrade as of a known time may be analyzed by comparing its behavior before installation of the software upgrade with that portion of the behavior of other members of the cohort that was observed prior to installation of the same upgrade at such other implementations. Similarly, an implementation associated with a user who was a member of the engineering department but who subsequently transferred to the marketing department may be analyzed by comparing the observed behavior of that implementation during the time the user was in the engineering department with the behavior of other implementations in the peer group that also were associated with the engineering department, etc.

Figure 6:
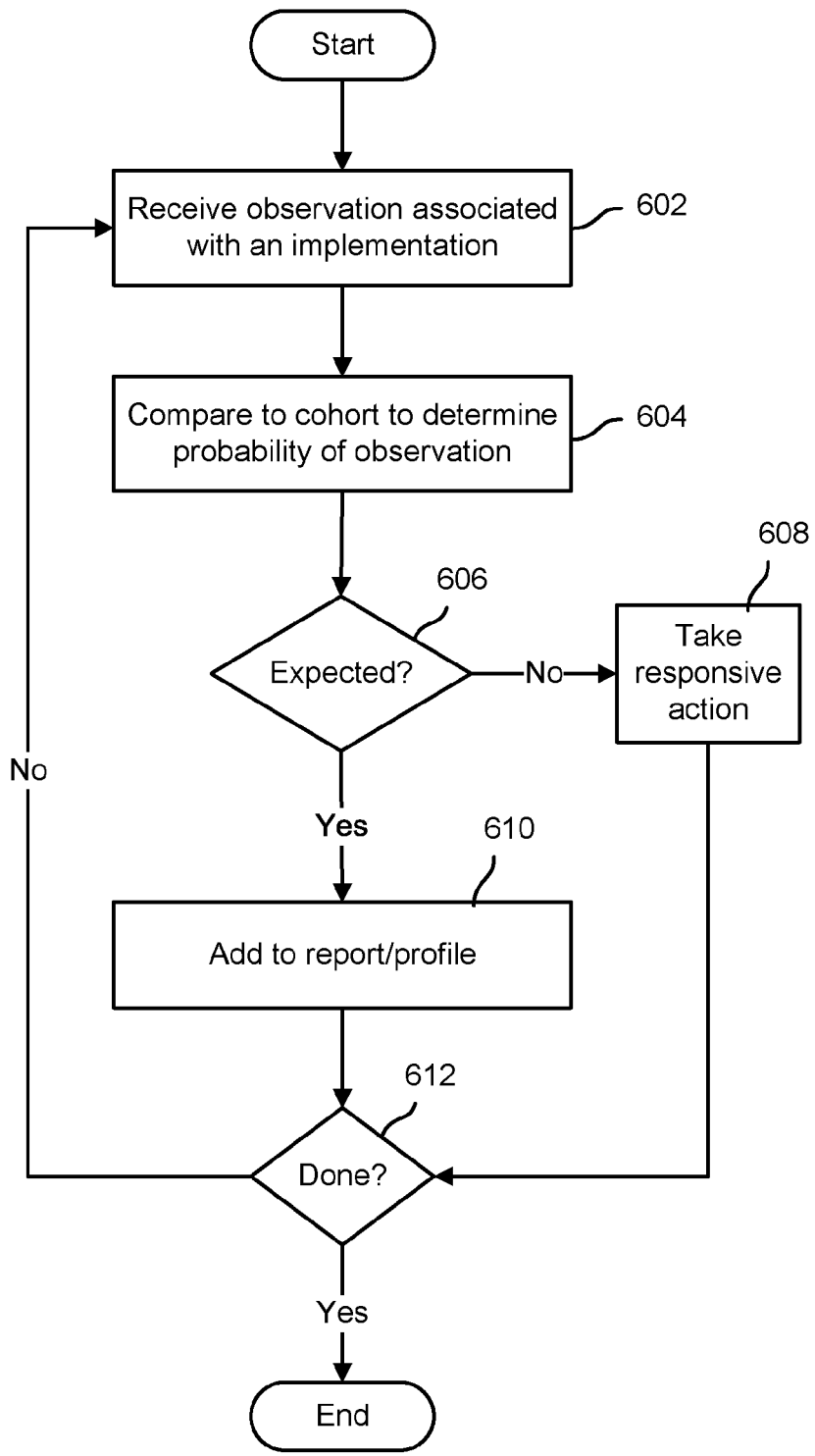
FIG. 6 is a flow chart illustrating an embodiment of a process to determine whether an observed behavior is an expected behavior for a member of a cohort.

FIG. 6 is a flow chart illustrating an embodiment of a process to determine whether an observed behavior is an expected behavior for a member of a cohort. In various embodiments, the process of FIG. 6 may be performed by a computer, such as statistical behavioral analysis server 114 of FIG. 1. In the example shown, specific behaviors/patterns of an implementation may be checked against the observed behavior of other implementations in the cohort to determine a statistical probability that the behavior would be exhibited by a member of the cohort. Observation data associated with an implementation is received (602). The observed behavior is compared to the observed behavior of other implementations in a cohort of which the implementation is a member to determine the probability the observed behavior would be exhibited by a member of the cohort (604). If the behavior is determined to not be sufficiently statistically likely, given the observed behavior of the cohort (606), then responsive action is taken (608), e.g., a notification may be sent, etc. If the behavior is determined to be sufficiently statistically likely (606), the observation is added to a report, database, and/or behavioral profile of the implementation (612). Processing continues as subsequent observations are received unless/until the process is ended (612), e.g., to take the server offline for maintenance.

In various embodiments, statistical techniques disclosed herein may be combined with and/or used in conjunction with one or more other approaches to provide a secure overall system. For example, in some embodiments, each request to a server, cloud-based service, API, protocol or layer, etc., may be provided to one or more implementations (e.g., peer instances of the service, etc.) to be processed. Results may be compared, in real time, to determine whether any response deviates from the other response(s). If so, a correct (e.g., consensus) response may be selected and provided, and corrective action may be taken with respect to the implementation that provided the outlier response. In various embodiments, a comparison based approach may be used to provide responses to requests, e.g., from clients or other consumers of a service, and may provide an ability to detect threats that are just emerging and/or which have not been detected using statistical techniques.

In some embodiments, a comparison based approach may be used to process client requests in real time. Other implementation behavior, such as changes to a database or other backend resource, may be performed only by a single implementation and may be analyzed over time using statistical techniques disclosed herein to detect unexpected and potential insecure behavior. In some embodiments, connections to a set of protected servers may use a comparison-based approach, while connections from the protected servers may be configured to use either the comparison-based approach, the statistical approach, or both (e.g., with statistical methods being configure as a default/fallback).

Figure 7:
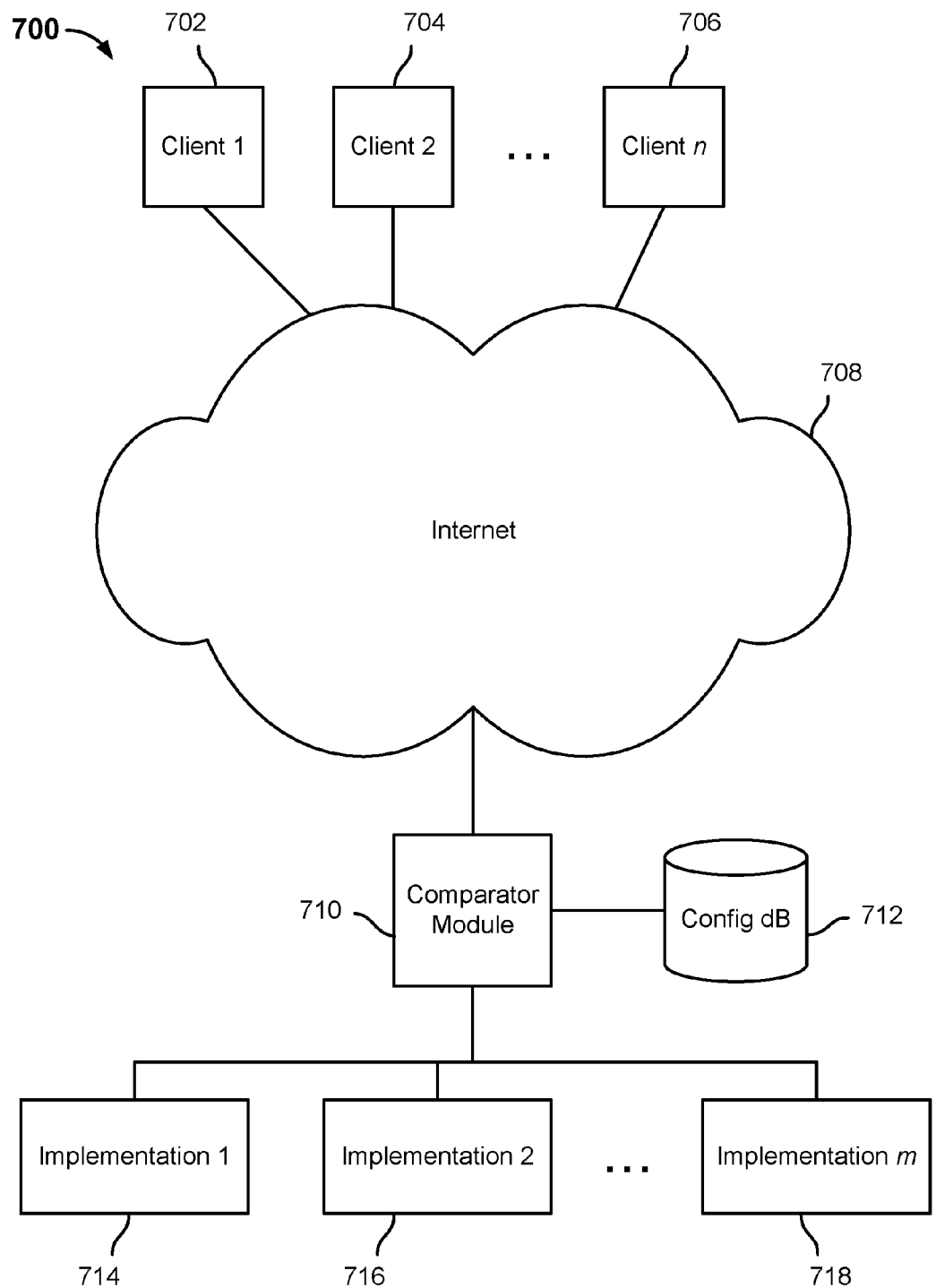
FIG. 7 is a block diagram illustrating an embodiment of a system and environment to provide implementation comparison-based security.

FIG. 7 is a block diagram illustrating an embodiment of a system and environment to provide implementation comparison-based security. In various embodiments, the comparison-based approach illustrated in FIG. 7 may be used in conjunction with statistical techniques as disclosed herein. In the example shown, computing environment 700 includes a plurality of clients 1 through n, represented in FIG. 7 by clients 702, 704, and 706. Clients 702, 704, and 706 are connected via the Internet 708 and/or one or more other networks to a comparator module 710. In various embodiments, comparator module 710 may include one or more software modules running on a general purpose computer, such as a server. Comparator module 710 may be configured to respond to requests received via the Internet 708 from clients, such as clients 702, 704, and 706, in a manner determined at least in part based on configuration data stored in a configuration database 712. In the example shown, comparator module 710 may be configured to respond to each client request by forwarding a copy of the same request to each of a prescribed number of implementations of an application, service, or other software or hardware provided functionality with which the request is associated. The implementations to which a particular request may be sent may include a subset of implementations selected from an available pool of implementations 1 through m, represented in FIG. 7 by implementation 714, 716, and 718. Examples of an implementation include, without limitation, different instances of a same version of an application or service; different versions, patch levels, etc. of a same application or service; different hardware and/or software platforms on which an application or service may be run; etc.

In various embodiments, comparator module 710 may be configured to receive from each implementation to which a given request has been sent a corresponding response generated by that implementation in response to the request. The comparator 710 compares the responses. In some embodiments, if all the responses are the same one of them is selected (e.g., at random, based on implementation IP or other address, etc.) to be sent to the requesting client. In various embodiments, if the comparison reveals that the responses are not all the same, the comparator module 710 takes responsive action, e.g., as configured per configuration database 712. Examples of responsive action may include, without limitation, selecting a correct or otherwise valid response to send to the requesting client; generating an alert, notification, or other communication or report; blocking access to and/or further use of an implementation that provided a response that did not match the response provide by its peers; etc.

In various embodiments, one or more forms of comparison may be made between implementations. In some embodiments, these forms of comparison may include one or more of the following: static analysis of the implementations, host-based behavioral comparison, raw comparison of traffic, semantic comparison of traffic, semantic comparison over protocol stacks, and comparison where the comparator must participate in the protocol, such as when cryptographic portions of a protocol require the comparator to engage in cryptographic actions itself in order to decrypt and compare encoded data.

Comparisons may be made with any number of implementations. When two implementations are used, it is only possible to identify that there is a difference. When three or more implementations are used, it is possible to distinguish between behavior that represents the statistical mode from outlier behavior. If outlier behavior is identified, it can be expected that vulnerabilities will manifest as outliers more often than as the statistical mode.

In various embodiments, depending on the preferences of the administrator, consumers of the service may be presented with outlier behavior, mode behavior, only unanimous behavior, an arbitrary selection among the implementation behaviors, or a replacement behavior not necessarily observed.

Static comparison may be performed using code analysis tools to analyze either the source code or the compiled code for various implementations. Static analysis may involve the formation of call graphs and analysis of the flow of data through code execution. This is commonly used as a way of analyzing a single program in isolation in order to better understand its behavior or in order to discover vulnerabilities. However, in various embodiments, the call graphs and data flow information for multiple independent implementations may be compared. In some embodiments, in cases where a static analysis tool can prove that the response to a user action differs between three different implementations, the difference may be considered to indicate an actual or potential vulnerability. In some cases, static analysis tools may not be able to prove different behaviors but may still have useful findings. For example, if a static analysis tool may be able to prove that one implementation is compliant but may be unable to form a proof regarding the behavior of another implementation, then it may be determined that the latter implementation has undefined behavior which may be indicative of a security flaw. This may be particularly true when the behavior in question is mandated by a standard and only one implementation deviates from the behavior of the rest.

When static comparison is performed, in some embodiments, the initial starting point is identifying common points of reference between implementations. Some examples of common points of reference would include string constants and the places in code that reference them, invocations of system calls or library routines that indicate a particular point in the protocol life cycle (such as a socket accept call on a listening socket), or manually identified object symbols or program addresses that refer to corresponding routines for processing particular parts of the protocol life cycle. Manually identified object symbols or program addresses may be provided by a user of a static comparison tool who has located the functions in two different programs that process the same protocol message, for example. Similar call or function flow graphs can also be an indicator of commonality between routines in two different programs subject to static analysis. Complex functionality may require that certain messages be implemented by the use of more complicated call graphs, for example if the proper response to a message requires many conditional clauses to determine an appropriate answer. When call graphs or execution flow graphs are both large and have an identical or very similar in structure the likelihood is greater than those graphs implement similar functionality. In order to determine when a call graph is similar in structure, a technique such as graph kernels may be used to compute an inner product that allows a quantification of the similarity between graphs.

In some embodiments, micro-segmentation techniques may be used to improve response capabilities. For example, in some embodiments, a processor may act as an intermediary capable of allowing, disallowing, or modifying network traffic to and from the protected servers (i.e., implementations).

In some embodiments, network access to the protected servers may only be available via a processor configured to perform comparison-based and/or statistical analysis based processing as disclosed herein. In some embodiments, if a deviation from expected behavior is detected, the processor may be configured to automatically isolate the anomalous server via use of the inline network capability.

In some embodiments, if a deviation from expected behavior is detected, responsive action that includes actions to modify software-defined infrastructure in the environment, including stopping, starting, or reconfiguring involved VMs, containers, network segments, firewalls, and load balancers based on user configuration to either block and protect or isolate for forensic purposes may be performed.

In various embodiments, techniques disclosed herein may be used to detect deviations from expected behavior, e.g., by comparing the behavior of an implementation to the observed behavior of its peers comprising a sub-population of a population of implementations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a memory or other storage device configured to store for each of a plurality of implementations of a computing resource a corresponding behavioral profile data comprising for each of a plurality of observed behavioral patterns observed to have been exhibited by an implementation a corresponding summary representation of one or more characteristic traits of the behavioral pattern; and
a processor coupled to the memory or other storage device and configured to:
read and use at least portions of said behavioral profile data associated with one or more implementations included in a cohort comprising a sub-population of said plurality of implementations identified by configuration data as being associated with said cohort to determine that an observed behavior of a member implementation of the cohort deviates from an expected behavior of members of the cohort;
receive a request associated with said sub-population of said plurality of implementations;
select two or more implementations within said sub-population to process the request;
receive from each a response to the request;
compare the responses;
determine, based at least in part on the comparison of the responses, a statistical mode response to be provided in response to the request;
detect that an outlier response not consistent with said statistical mode response was returned by one or more of said two or more implementations; and
take responsive action with respect to said one or more implementations that provided the outlier response.

2. The system of claim 1, wherein the process is further configured to receive observation data associated with observed behavior of implementations included in said plurality of implementations; generate said behavioral profile data based at least in part on said observation data; and store said behavioral profile data in said memory or other storage device.

3. The system of claim 2, wherein the processor is further configured to update said behavioral profiles based at least in part on observation data received subsequently to one or both of creation and last update of said behavioral profiles.

4. The system of claim 3, wherein the processor is configured to accumulate observation data and to perform said update based at least in part on a determination that an update criteria has been met.

5. The system of claim 1, wherein each of said computing resources comprises one or more of a device, a hardware platform, a virtual machine, a container, an application or other software, a configuration, a protocol, a standards-based resource, a physical or logical storage device, a database, and a service.

6. The system of claim 1, wherein said summary representation comprises a set of coefficients or other values for each of a plurality of variables.

7. The system of claim 1, wherein said summary representation comprises a vector in a multidimensional space.

8. The system of claim 1, wherein said processor is configured to determine that an observed behavior of a member implementation of the cohort deviates from an expected behavior of members of the cohort at least in part by comparing a behavioral profile of the member implementation, or a portion thereof, to corresponding portions of the respective behavioral profiles of other implementations in the cohort.

9. The system of claim 1, wherein said processor is configured to determine that an observed behavior of a member implementation of the cohort deviates from an expected behavior of members of the cohort at least in part by computing based on behavioral profile data of the cohort a statistical probability associated with the observed behavior.

10. The system of claim 1, wherein the processor is further configured to take responsive action based on said determination that the observed behavior deviates from an expected behavior of members of the cohort.

11. The system of claim 1, wherein the processor is further configured to act as an intermediary between one or more clients associated with said sub-population of said plurality of implementations, on the one hand, and said sub-population of said plurality of implementations on the other.

12. The system of claim 11, wherein the processor is further configured to block traffic between said clients and said one or more implementations that provided the outlier response based at least in part on detection of said outlier response.

13. The system of claim 11, wherein the processor comprises a sole way to obtain network access to said sub-population of said plurality of implementations.

14. The system of claim 1, wherein the processor is further configured to take responsive action in response to said determination that an observed behavior of a member implementation of the cohort deviates from an expected behavior of members of the cohort.

15. The system of claim 14, wherein the responsive action includes an action to modify a software-defined infrastructure in an environment with which said member implementation, including by doing one or more of stopping, starting, or reconfiguring involved VMs, containers, network segments, firewalls, and load balancers based on user configuration to do one or more of block, protect, and isolate the member implementation for forensic purposes.

16. A method, comprising:
   storing for each of a plurality of implementations of a computing resource a corresponding behavioral profile data comprising for each of a plurality of observed behavioral patterns observed to have been exhibited by an implementation a corresponding summary representation of one or more characteristic traits of the behavioral pattern;
   using at least portions of said behavioral profile data associated with one or more implementations included in a cohort comprising a sub-population of said plurality of implementations identified by configuration data as being associated with said cohort to determine that an observed behavior of a member implementation of the cohort deviates from an expected behavior of members of the cohort;
   receiving a request associated with said sub-population of said plurality of implementations;
   selecting two or more implementations within said sub-population to process the request;
   receiving from each a response to the request;
   comparing the responses;
   determining, based at least in part on the comparison of the responses, a statistical mode response to be provided in response to the request;
   detecting that an outlier response not consistent with said statistical mode response was returned by one or more of said two or more implementations; and
   taking responsive action with respect to said one or more implementations that provided the outlier response.

17. The method of claim 16, further comprising receiving observation data associated with observed behavior of implementations included in said plurality of implementations; and generating said behavioral profile data based at least in part on said observation data.

18. The method of claim 17, further comprising updating said behavioral profiles based at least in part on observation data received subsequently to one or both of creation and last update of said behavioral profiles.

19. The method of claim 18, further comprising accumulating observation data and performing said update based at least in part on a determination that an update criteria has been met.

20. A computer program product embodied in a non-transient computer readable medium and comprising computer instructions for:
   storing for each of a plurality of implementations of a computing resource a corresponding behavioral profile data comprising for each of a plurality of observed behavioral patterns observed to have been exhibited by an implementation a corresponding summary representation of one or more characteristic traits of the behavioral pattern; and
   using at least portions of said behavioral profile data associated with one or more implementations included in a cohort comprising a sub-population of said plurality of implementations identified by configuration data as being associated with said cohort to determine that an observed behavior of a member implementation of the cohort deviates from an expected behavior of members of the cohort;
   receiving a request associated with said sub-population of said plurality of implementations;
   selecting two or more implementations within said sub-population to process the request;
   receiving from each a response to the request;
   comparing the responses;
   determining, based at least in part on the comparison of the responses, a statistical mode response to be provided in response to the request;
   detecting that an outlier response not consistent with said statistical mode response was returned by one or more of said two or more implementations; and
   taking responsive action with respect to said one or more implementations that provided the outlier response.

21. The computer program product of claim 20, further comprising receiving observation data associated with observed behavior of implementations included in said plurality of implementations; generate said behavioral profile data based at least in part on said observation data; and store said behavioral profile data in said memory or other storage device.

22. The computer program product of claim 21, further comprising updating said behavioral profiles based at least in part on observation data received subsequently to one or both of creation and last update of said behavioral profiles.

23. The computer program product of claim 22, further comprising accumulating observation data and performing said update based at least in part on a determination that an update criteria has been met.

* * * * *